Patented June 16, 1942

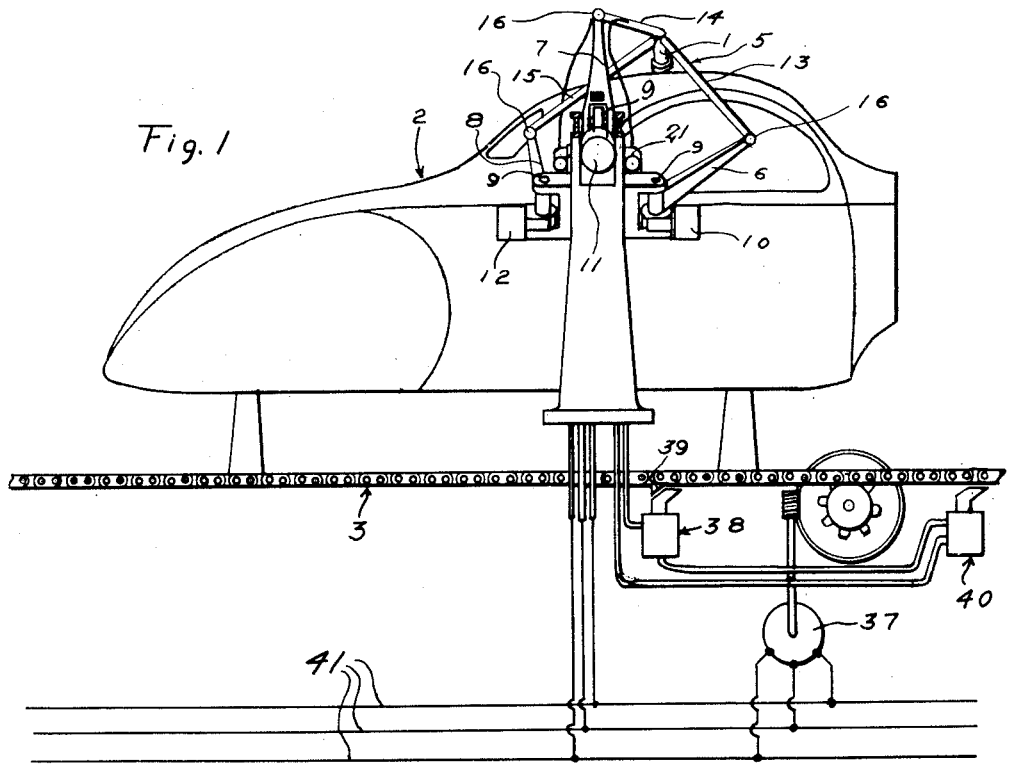
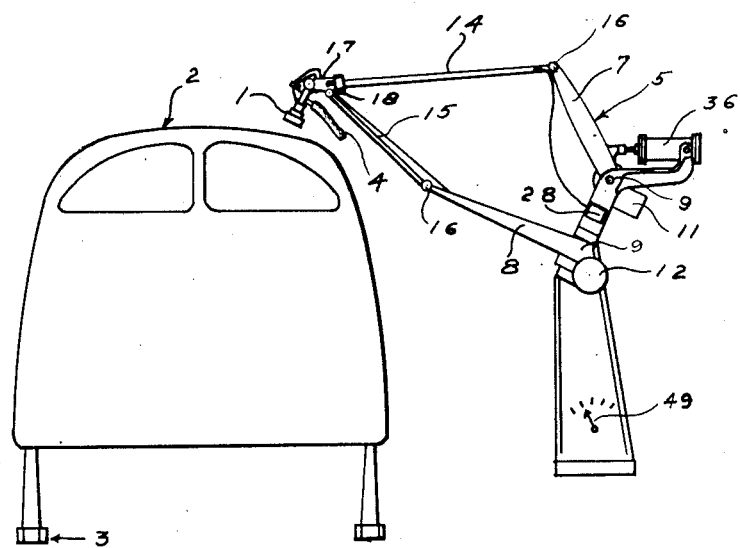

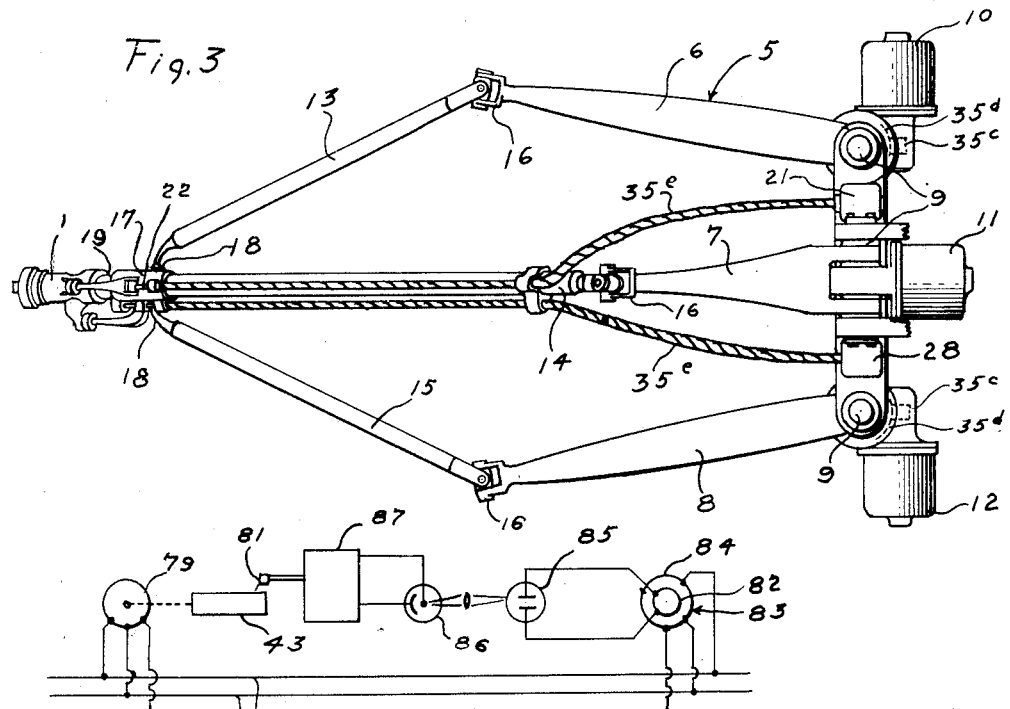
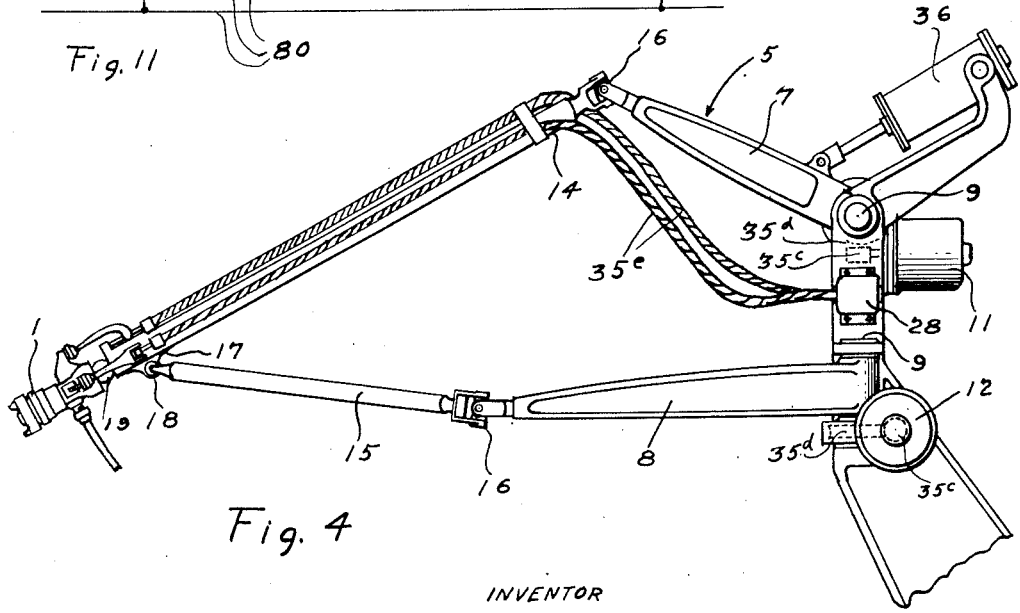

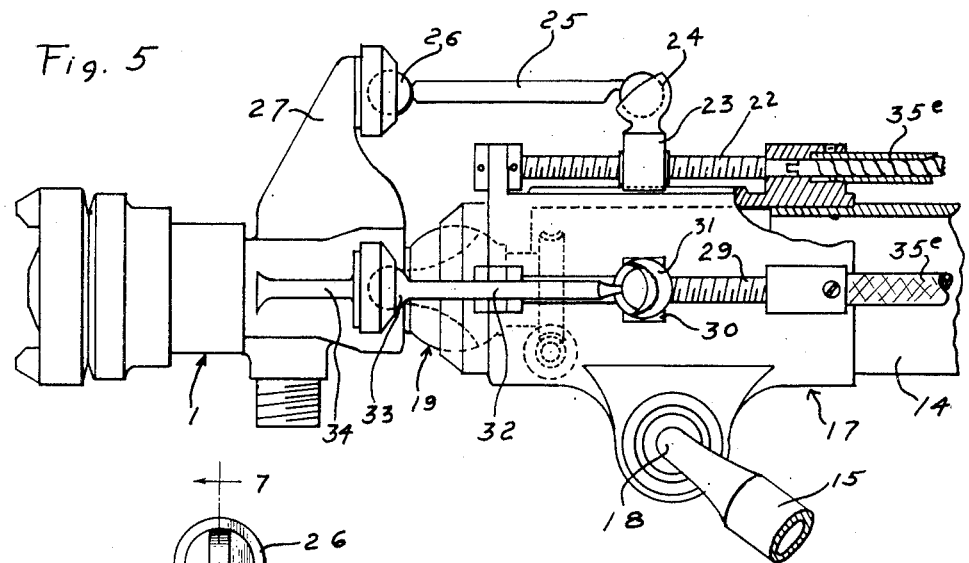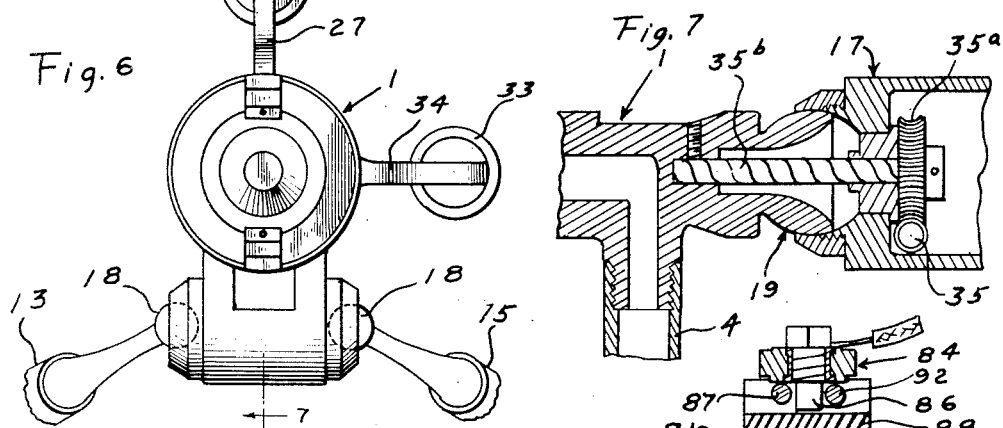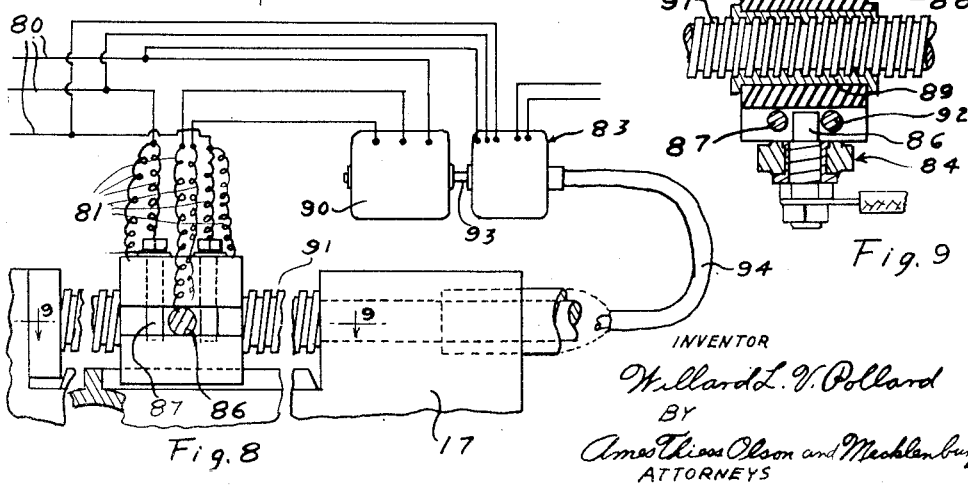

2,286,571

UNITED STATES PATENT OFFICE 2,286,571

POSITION-CONTROLLING APPARATUS

Willard L. V. Pollard, Evanston, Ill.

Application April 22, 1938, Serial No. 203,634
Renewed June 14, 1940

14 Claims. (Cl. 91—45)

My invention relates to position-controlling apparatus. More specifically it relates to apparatus for controlling the movement and positioning of a spray gun for controlling it in its movement with respect to curved or irregular surfaces to be coated, such as an automobile body or the like. In some of its aspects the apparatus is an improvement upon, or modification of, apparatus shown in the co-pending application of Willard L. Pollard, Serial No. 750,605, filed October 29, 1934.

One of the objects of my invention is to provide positioning apparatus which will require a relatively small amount of power for operation and in which a wide range of positioning movement is possible.

Further objects and advantages of the invention will be apparent from the description and claims.

In the drawings, in which an embodiment of my invention is shown,

Figure 1 is a diagrammatic side elevational view showing my improved apparatus used in applying a coating to an automobile body;

Fig. 2 is an end elevation of Fig. 1;

Fig. 3 is a plan view of part of the positioning apparatus;

Fig. 4 is a side elevational view of the apparatus of Fig. 3;

Fig. 5 is a plan view of the tool head and spray gun;

Fig. 6 is an end elevational view of the apparatus of Fig. 5;

Fig. 7 is an axial sectional view of part of the apparatus of Fig. 6, taken on the line 7—7 of Fig. 6;

Fig. 8 is a diagrammatic view of part of a recording apparatus;

Fig. 9 is a sectional view substantially on the line 9—9 of Fig. 8;

Fig. 11 is a diagrammatic view showing part of the recording circuit.

Figure 10:
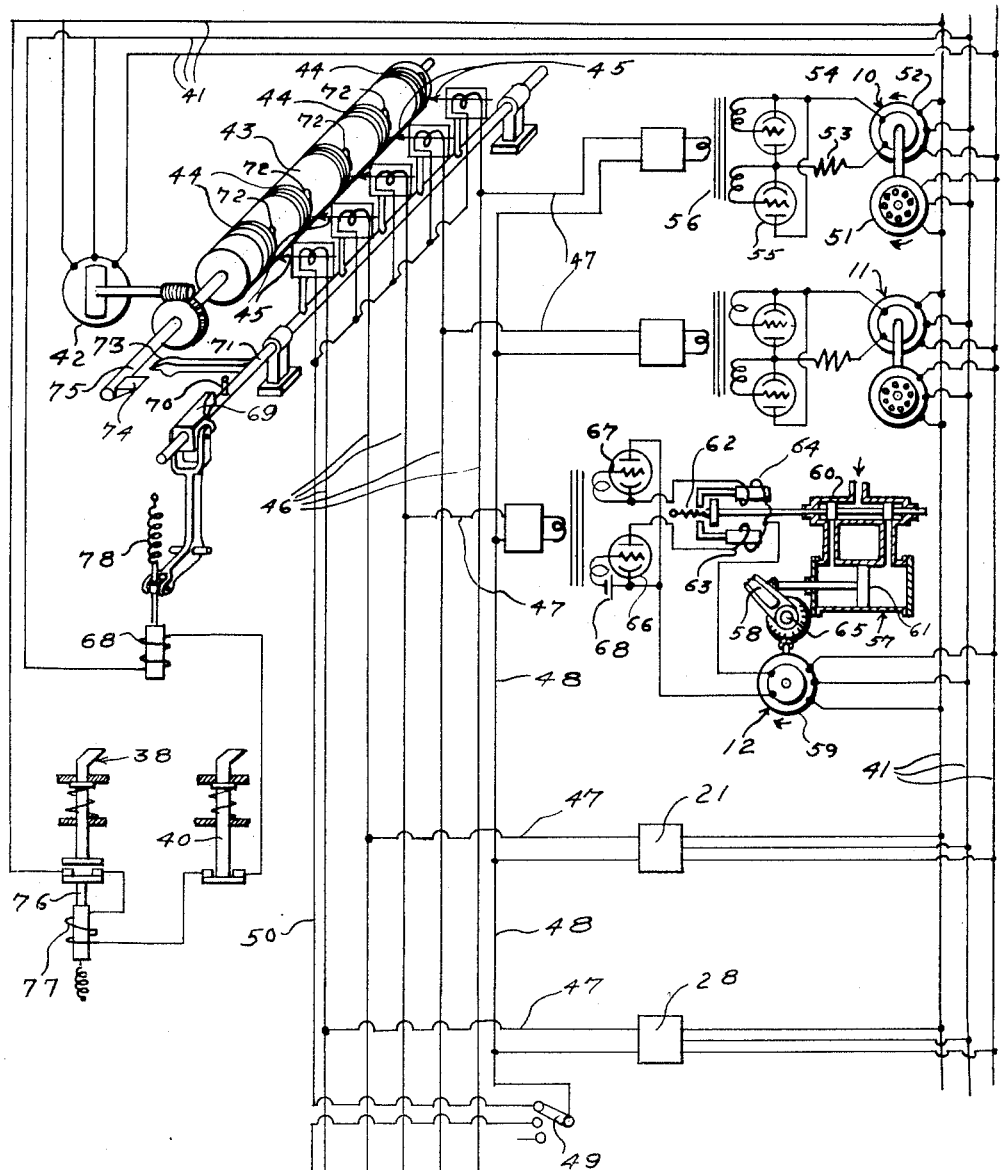
Fig. 10 is a diagrammatic view showing the control motors and the record for controlling the motors.

Referring first to Figs. 1 to 7, inclusive, the apparatus here shown comprises a spray gun 1 for spraying a liquid coating onto an automobile body 2 or the like, which body is mounted on a traveling conveyor 3, a conduit 4 for supplying paint or the like to the spray gun 1, and means 5 controlled by a plurality of rotary differential electric motors for controlling the movement and positioning of the spray gun 1 with respect to the surface to be sprayed.

The movement controlling and positioning apparatus comprises three primary arms 6, 7, and 8, each mounted to oscillate about a fixed axis 9, a plurality of rotary differential electric motors 10, 11, and 12 for controlling the oscillating movement of these primary arms 6, 7, and 8, respectively, and three secondary arms 13, 14, and 15, each having a universal joint connection 16 at one end with an end of one of the primary arms and each secondary arm being connected with a spray gun supporting head 17.

In addition to this general positioning of the spray gun carrying head, means are provided for effecting a limited universal movement of the spray gun 1 with respect to the gun-carrying head 17. It will be noted that the universal joints 16 between the primary arms and the secondary arms are of the knuckle type, or they may be of the Cardan type, so that while universal movement of the secondary arm is permitted, the secondary arms are held against rotating movements about their own axes. With this understanding, it is now stated that the gun-carrying head 17 is rigidly mounted on the end of the upper one 14 of the secondary arms and that the other secondary arms 13 and 15 are secured to this gun-carrying head 17 by means of ordinary ball and socket joints 18. In order to enable rocking or universal movement of the spray gun with respect to the gun-carrying head, a universal ball and socket 19 (Fig. 7) is provided between the gun and head, as shown in Figs. 5 and 7. I may find it desirable to provide three rotary differential electric motors for controlling the movement of the spray gun 1 with respect to the gun-carrying head 17. One of these differential motors 21 may control the rotary movement of a screw-threaded shaft 22 (Figs. 3 and 5), the shaft being held against axial movement and causing sliding movement of a nut 23 which is connected by a ball and socket joint 24 to a link 25 which is connected by a ball and socket joint 26 to an arm 27 on the spray gun 1 for effecting rocking movement of the spray gun about a horizontal transverse axis as viewed in Figs. 5 and 6. Another of these differential motors 28 may control the rotary movement of a screw-threaded shaft 29 held against axial movement and having threaded engagement with a nut slide 30 having a ball and socket connection 31 with a link 32 which has a ball and socket connection 33 with a laterally-extending arm 34 on the spray gun 1 to effect oscillatory movement of the spray gun with respect to the gun-carrying head 17 about a vertical transverse axis as viewed in Fig. 5.

As the spray delivered by the spray gun is often in the form of a thin, flat spray, it may be desirable to provide for an oscillatory movement of the spray gun about its own axis. For this purpose, another differential electric motor (not shown) may be provided which controls the rotation of a shaft carrying a worm 35 engaging a worm gear 35a on the flexible shaft 35b which extends into and is secured to the spray gun as shown in Fig. 7.

The shaft of each of the differential motors may be provided with a worm 35c meshing with a worm gear 35d secured to rotate with one of the primary arms. The screws 29 and 32 which control the position of the slidable nuts may be driven from the differential motors by means of flexible shafting 35e. Also, the worm 35 which drives the worm wheel 35a may be driven from a differential motor by means of flexible shafting. If desired, a fluid pressure servometer 36 (Figs. 2 and 4) of any suitable type may be provided to counteract the effect of the weight of the primary and secondary arms of the apparatus. A suitable synchronous motor 37 (Fig. 1) may be provided for driving the conveyor 3 which carries the car body 2 underneath the spray gun. A suitable switch 38 (Figs. 1 and 10) may be provided, closed by a cam 39 on the conveyor chain, for initiating the controlled movement of the movement-controlling apparatus. Also, a suitable switch 40 may be provided engaged by this cam 39 on the conveyor for resetting the control mechanism and record back to a position ready to repeat the program after the automobile body 2 has passed on. By means of this apparatus, it will be seen that the spray gun can be moved over the entire surface to be coated as the object being coated is moved along and that the spray gun can be held at the desired angle with respect to the surface to be coated.

Referring now to Fig. 10, this shows a three phase, alternating current, main power supply line 41 connected to drive a synchronous motor 42 geared to a cylinder record 43, having thereon a plurality of spaced recordings 44. A plurality of phonograph pickups 45 bear against these recordings 44 and are individually connected through wires 46, 47, 48, switch 49, and wire 50, each to a corresponding differential electric motor 10, 11, 12, 21 or 28, as the case may be. The motors 10, 11, 12 21, and 28 are also connected to the main line 41 and are arranged to move exactly proportionally to the net difference in phase between the voltage in the line 41 and the voltage from the pickups 45. Since the recordings 44 are driven at exact synchronism with the line voltage 41, this phase difference will be absolutely predetermined by the portion of the recordings 44 being traced at any given movement by the pickups 45. It follows that, by proper arrangement of waves recorded upon the record 43, any desirable sequence of motion may be automatically imposed upon the motors. To be concrete, assume that the frequency of the line 41 is 60 cycles per second, and that the synchronous motor 42 is geared to drive the record 43 at one revolution per second. Suppose that the first turn of the groove in a recording 44 contains sixty wave impressions; the second, fifty; the third, sixty-five, then a motor connected to the pickup 45 riding on the recording groove will move in accordance with the difference between the number of impulses each second from the pickup 45 and the constant frequency of sixty cycles in the supply line, thereby remaining stationary during the first second, revolving ten revolutions in one direction in the next second, reversing five revolutions in the third second, and so on. The motions of each of the motors will thus be predetermined, and may be applied to suitable mechanisms desired to give a predetermined program of movement; as, for instance, the painting machine mechanisms forming the subject matter of the present invention before described.

Amplifiers of a conventional type might be used for applying the electrical impulses from the pickups 54 to the motors. However, I may prefer to use special circuits described herewith. The motor 10 comprises an induction motor 51 adapted to exert a continual clockwise torque and a differential electric motor 52 having a three phase stationary winding connected to the power line 41 so as to produce a counterclockwise field rotation and a rotor connected to the shaft of the motor 51 so as to be subjected to clockwise torque thereby. The winding of this rotor is connected through a resistance 53 to discharge through a pair of thyratron tubes 54 and 55 connected with plates and filaments hooked together so as to be capable of passing current in either direction through the resistance 53. The grids of these tubes are energized in opposite phase by the transformer 56. This will cause the motor 52 to move exactly in accordance with the difference between the phase of the current coming from the pickups 45 and line 41, since the motor 51 will rotate the motor 52 clockwise until the consequent advance in phase of the E. M. F. induced in the rotor of the motor 52 overtakes the phase of energization of the grids of the tubes 54 and 55, which tubes will then commence to discharge current from the rotor of the motor 52 through the resistance 53. The power thus drawn from the rotor of the motor 52 will cause the motor to follow the counterclockwise rotation of the stator field against the torque (clockwise) of the motor 51. The phase of the rotor currents will thereby be retarded, and when they have been retarded an amount indicating that the rotor of the motor 42 is back to its proper position the E. M. F. of the rotor will no longer overtake the open period of the thyratrons, which will then cease to draw power from the rotor, which will then again yield to the motor 51 and be oscillated back again to energy-drawing position and so on. Thus the duplex motor 10 will always move so as to keep rotor currents approximately equal to the frequency of the impulses from the pickups 45, which movement will obviously be that desired.

A somewhat different type of motor system is shown at 12, and comprises a pneumatic motor 57 connected to a pivoted arm 58 geared to a differential electric dynamo 59. The pneumatic motor 57 has a slide valve 60 which, if slid to the left will obviously cause the piston of the motor 57 to move to the right, and vice versa. In the central position shown, the piston 61 will remain stationary. A tension spring 62 tends to continually bias the valve 60 to the left. A first solenoid 63 is adapted, when energized, to move the valve 60 against the action of the spring 62 to its neutral central position, but no further. A second solenoid 64 is adapted, when energized, to move the valve 60 to its extreme right hand position. Consequently, when neither solenoid is energized, the piston 61 of the motor 57 will move to the right; when solenoid 63 alone is energized, the piston will remain stationary, and when both solenoids 63 and 64 are energized, the piston will move to the left. Movement of the piston 61 will rock the lever 58 upon its pivot 65 and rotate the motor 59 geared thereto. The servomotor 36 of Fig. 4 may be related to the arm 5 and differential motor 11 in the same manner in which the pneumatic servomotor 57 is related to the arm 58 and differential motor 12.

A pair of thyratrons 66 and 67 are connected to the rotor of the motor 59 similarly as in the case of the motor 10 previously described, except that the thyratrons are arranged to discharge, respectively, through the solenoids 63 and 64, and the thyratron 66 is biased by a battery 68 so as to shift the end of its open period relative to the open period of the thyratron 67, whereby the phase of E. M. F. in the rotor of dynamo 59 must be further advanced to fire the thyratron 67 (and thereby energize the solenoid 64) than to fire the thyratron 66 and energize the solenoid 63. It will be obvious from inspection that this energizing and de-energizing of the solenoids 63 and 64 will cause the pneumatic motor 57 to move the dynamo 59 according to the difference of the phases in the line 41 and its individual pickup 45; assuming that the stator of the dynamo 59 produces a clockwise rotating field and that the rotor of the dynamo 59 has gone too far clockwise, the phase of E. M. F. in the rotor will be retarded, neither thyratron 66 nor 67 will fire, and the spring 62 will pull the valve 64 to the left. This will cause the pneumatic motor 57 to rotate the rotor of the dynamo 59 counterclockwise, advancing the phase and eventually firing the thyratron 66 and causing the solenoid 63 to neutralize the valve 60; if the rotor goes too far counterclockwise, the thyratron 67 will be fired, the valve 60 will be drawn to its full right position and the motor 57 will move the rotor of the dynamo 15 clockwise again.

As shown, the apparatus of Figure 10 comprises a plurality of separate multiple records 43 and associated parts, including a plurality of pickups 45 each having one terminal connected to the control bus wires 46 and therethrough to the corresponding individual motors 10, 11, 12, etc. All the pickups of any record 43 have their other terminals connected to return lines 50 connected to points of the switch 49, whereby these return lines may be selectively connected to the common return line 48 from the motors 10, 11, 12, etc., in order to select the proper program of movement. If it is desired to paint a "coupe" coming up the line, a record 43 will be selected which has a record suitable for this model; if a "sedan," another record will be selected; and so on.

The records 43 are all automatically started each time the conveyor depresses the switch 38. The switch 38 energizes a solenoid 68 which draws the cam stop slide 69 away from the pin 70 on the slidable and rockable shaft 71, thereby permitting the pickups to drop down on the record grooves 53. The first groove of each recording 44 is deep and wide, as shown at 72, whereby, when the pickups 45 drop, their needles are caught and drawn on to the record. In order to insure that the pickups 45 will not drop at a point at which some of the pickups might engage the enlargements 72 and some not, the shaft 71 is provided with an arm 73 and a dog 74 is placed on the shaft 75 of the record 43, which dog 74 will catch the arm 73 if it drops at an improper moment for good engagement of the pickup needles.

In order to hold the cam stop 69 to the left all the time the auto body is passing the painting station, the switch 38 is shunted with a switch 76 which is held up by a coil 77 and energized by the circuit of the switch 38. In this way, the switch 76 will be held closed, and the solenoid 77 will continue to be energized even after the switch 38 is released by the conveyor. The circuit is finally broken when the conveyor hits the switch 40, whereupon the spring 78 will shift the cam stop 69 to the right, rotating the shaft 71 to lift the pickups 45 off the record 43 and shifting the shaft 71 back to the right to bring the pickups again into position to drop into the enlarged grooves 72.

The synchronous motor 37 is driven from the line 41, whereby to tie the conveyor in with the operation of the painting machine. The gearing of this motor to the conveyor should be made close to the painting station, whereby to maintain this position of the conveyor at exact synchronous speed. If several painting stations are used on the one conveyor, one such motor 37 should be placed at each station to insure synchronous operation of the conveyor at that point.

In Figs. 8, 9 and 11 are shown circuits and apparatus used in connection with the making of suitable records. Fig. 11 shows in general the circuit arrangement in which a synchronous motor 79 is connected with a three phase, alternating current supply 80 for driving the record blank on which the recordings are to be made. The motion of the recording needle 81 is controlled by the rotor 82 of a differential motor 83, the stator 84 of which is connected to the supply line and the rotor of which controls a glow tube 85, which in turn controls a photoelectric tube connected with an amplifier which controls the movement of the recording stylus 81.

The rotor 82 of the differential motor 83 is controlled in its movement by the manual operations used in performing an operation. For example, in painting a surface, the rotor 82 of this motor, as well as the rotors of several other differential motors, might be rotated, first in one direction, and then in the opposite direction by the movement of a tool in the hands of the workman so that the recording on the record would correspond to the oscillations of the rotor of the differential motor. Such a record when used in a reproducer, such as shown in Fig. 10, would cause the differential motors 10, 11, etc., to reproduce the movement back and forth of the recording motor and consequently could be used to control the movement of a tool which would altomatically and mechanically repeat the original manual operation.

In order to relieve the operator in carrying out his manual operation from the actual work of causing the rotation of the rotor of the differential motor 83, I have provided means whereby the actual rotation of the rotor will be effected by power means controlled by the manipulation of the tool. Such a construction is shown in Figs. 8 and 9. These figures show a part of the tool-carrying head 17 having mounted thereon a slide member 84, the position of which is controlled, for example, by the position of the spray gun 1 with respect to the gun-carrying head 17, the slide 84, for example, being connected with the gun by means of a link 25 and arm 27 as in Fig. 5. If the gun is moved with respect to the head in such a manner as to bring the contact pins 86 carried by the slide into engagement with the contact pins 87 carried by an insulating bushing 88 surrounding the nut 89, a circuit will be established which will cause the reversible motor 90 to operate in a direction which will rotate the feed screw 91 in a direction to move the nut 89 and contacts 87 carried thereby to the left, as viewed in Fig. 9, so that so long as the contact pins 86 are maintained in engagement with the contact pins 87 the motor 90 will continue to move the nut 89 to the left. Conversely, if the slide 84 is moved so as to bring the contact pins 86 into engagement with the contact pins 92, the reversible motor 90 will be caused to move in a direction to move the slide 84 to the right, as viewed in Fig. 1, and this movement to the right will be continued so long as the contact pins 86 are maintained in engagement with the contact pins 92.

The drive from the reversible motor 90 is through the shaft 93 of the differential motor 83 and through a flexible shaft 94 connecting the shaft of the differential motor 83 with the feed screw 91. This differential motor 83 is accordingly driven, first in one direction, and then in the other, depending upon the motions of the spray gun with respect to the gun-carrying head, and these motions of the differential rotor are duly recorded by apparatus such as shown in Fig. 11.

Fig. 8 shows conventional wiring for the differential motor 83, the reversible motor 90, and the reversing switch 84 for the reversible motor, including a three phase, alternating current supply 80 with flexible conductors 81 connecting the switch mechanism 84 with the supply line 80 and reversible motor 90.

I claim:

1. Tool - positioning apparatus comprising three primary arms, each pivoted to swing about an axis, three rotary differential electric motors for controlling the swinging movement of the said arms, respectively, three secondary arms, each pivotally connected at one end with one end of one of said primary arms, and a tool carried by said secondary arms to which the other ends of said secondary arms are connected.

2. Tool - positioning apparatus comprising three primary arms, each pivoted to swing about an axis, three rotary differential electric motors for controlling the swinging movement of the said arms, respectively, three secondary arms, each pivotally connected at one end with one end of one of said primary arms, a tool head carried by said secondary arms to which the other ends of said secondary arms are connected, a tool movably mounted on said head, and a rotary differential electric motor for controlling the movement of the tool with respect to the head.

3. Tool - positioning apparatus comprising three primary arms, each pivoted to swing about an axis, three rotary differential electric motors for controlling the swinging movement of the said arms, respectively, three secondary arms, each pivotally connected at one end with one end of one of said primary arms, a tool head carried by said secondary arms to which the other ends of said secondary arms are connected, a tool pivotally mounted on said head, and a rotary differtail electric motor for controlling the pivotal movement of the tool on the head.

4. Tool - positioning apparatus comprising three primary arms, each pivoted to swing about an axis, individual power means for controlling the swinging movement of the said arms, respectively, three secondary arms, each pivotally connected at one end with one end of one of said primary arms, and a tool carried by said secondary arms to which the other ends of said secondary arms are connected.

5. Tool - positioning apparatus comprising three primary arms, each pivoted to swing about an axis, indivdual power means for controlling the swinging movement of the said arms, respectively, three secondary arms, each pivotally connected at one end with one end of one of said primary arms, a tool head carried by said secondary arms to which the other ends of said secondary arms are connected, a tool pivotally mounted on said head, and a rotary differential electric motor for controlling the pivotal movement of the tool on the head.

6. A tool-aiming device comprising a tool head, a tool, a joint between the said tool and said head permitting pivotal movement in two directions of said tool relatively to said head while restricting translatory movement of the tool relatively to the head, first and second lateral extensions on said head, first and second links pivotally connected at one end to said first and second extensions, respectively, and first and second power means on said head pivotally connected to the other ends of said first and second links, respectively, and adapted to impart translatory movement to said links relatively to said head.

7. A tool-aiming device comprising a tool head, a tool, a connecting element between said tool and said head adapted to permit rotary movement of said tool relatively to said element in two directions and to restrain both rotary movement relatively to said element in a third direction and also translatory movement of said tool relatively to said head, power means mounted on said head for rotating said connecting link relatively to the head, first and second lateral extensions on said head and first and second links pivotally connected to said first and second extensions, respectively, and first and second power means on said head pivotally connected to the other ends of said first and second links, respectively, and adapted to impart translatory movement to said link relatively to said head.

8. An apparatus for recording movement of a tool comprising power means, and a driving train between said power means and said tool adapted to transmit motion from said power means to said tool, said driving train including as a first element a flexible shaft and as a second element a lost-motion connection, one of said elements being connected to said power means to transmit power to the other of said elements and the other of said elements being connected to transmit power from the one element to the tool, said lost-motion connection including means adapted when the lost motion is under stress in one direction to energize the power means to operate the tool in one direction and when under stress in the other direction to energize the power means to operate the tool in the other direction.

9. Tool-positioning apparatus comprising a base, three arms, an individual power means for each of said arms mounted on said base, each of said power means extending to one end of its respective arm and being arranged to produce a control movement of said end relatively to said base, the opposite ends of said arms converging, and a tool connected to and supported by the converging ends of said arms.

10. Tool-positioning apparatus comprising a base, three arms, an individual power means for each of said arms mounted on said base, each of said power means extending to one end of its respective arm and being arranged to produce a control movement of said end relatively to said base, the opposite ends of said arms converging, a tool head connected to and supported by the converging ends of said arms, a tool movably mounted on said head, and power means for controlling the movement of the tool with respect to the head.

11. Tool-positioning apparatus comprising a base, three arms, an individual power means for each of said arms mounted on said base, each of said power means extending to one end of its respective arm and being arranged to produce a control movement of said end relatively to said base, the opposite ends of said arms converging, a tool head connected to and supported by the converging ends of said arms, a tool pivotally mounted on said head, and power means for controlling the pivotal movement of the tool on the head.

12. Tool-positioning means comprising a base; a first, a second and a third arm; an individual power means mounted on said base for each of said arms, each of said power means extending to its respective arm; a pivotal connection from each said power means to its respective arm, each said power means being arranged to impart a control movement to its said arm through said pivotal connection; a pivotal connection between said first and second arms at ends thereof opposite the said pivotal connections from their respective power means; another pivotal connection between said first and third arms at ends thereof opposite the said pivotal connections from their respective power means; and a tool mounted on one of said arms.

13. Tool-positioning means comprising a base; a first, a second and a third arm; an individual power means mounted on said base for each of said arms, each of said power means extending to its respective arm; a pivotal connection from each said power means to its respective arm, each said power means being arranged to impart a control movement to its said arm through said pivotal connection; a pivotal connection between said first and second arms at ends thereof opposite the said pivotal connections from their respective power means; another pivotal connection between said first and third arms at ends thereof opposite the said pivotal connections from their respective power means; a tool head mounted on one of said arms; a tool movably mounted on said head; and power means for controlling the movement of the tool with respect to the head.

14. Tool-positioning means comprising a base; a first, a second and a third arm; an individual power means mounted on said base for each of said arms, each of said power means extending to its respective arm; a pivotal connection from each said power means to its respective arm, each said power means being arranged to impart a control movement to its said arm through said pivotal connection; a pivotal connection between said first and second arms at ends thereof opposite the said pivotal connections from their respective power means; another pivotal connection between said first and third arms at ends thereof opposite the said pivotal connections from their respective power means; a tool head mounted on one of said arms; a tool pivotally mounted on said head; and power means for controlling the pivotal movement of the tool on the head.

WILLARD L. V. POLLARD.